United States Patent
Kim et al.

(10) Patent No.: US 12,198,322 B2
(45) Date of Patent: Jan. 14, 2025

(54) ELECTRONIC DEVICE AND METHOD FOR CHECKING CONNECTION OF A CONNECTOR

(71) Applicant: SAMSUNG ELECTRONICS CO., LTD., Suwon-si (KR)

(72) Inventors: Younggi Kim, Suwon-si (KR); Jaekeun Lee, Suwon-si (KR); Jaeil Jung, Suwon-si (KR); Youngwoong Kim, Suwon-si (KR); Joonseop Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 355 days.

(21) Appl. No.: 17/711,605

(22) Filed: Apr. 1, 2022

(65) Prior Publication Data

US 2022/0343488 A1     Oct. 27, 2022

Related U.S. Application Data

(63) Continuation of application No. PCT/KR2022/003759, filed on Mar. 17, 2022.

(30) Foreign Application Priority Data

Apr. 22, 2021  (KR) ............ 10-2021-0052179
Jul. 27, 2021  (KR) ............ 10-2021-0098638

(51) Int. Cl.
*G06T 7/00*    (2017.01)
*G06V 40/20*   (2022.01)

(52) U.S. Cl.
CPC ............ *G06T 7/0004* (2013.01); *G06V 40/20* (2022.01); *G06T 2207/30164* (2013.01); *G06T 2207/30196* (2013.01)

(58) Field of Classification Search
CPC ......... G06T 7/0004; G06T 2207/30164; G06T 2207/30196; G06V 40/20
See application file for complete search history.

(56) References Cited

U.S. PATENT DOCUMENTS

| 2016/0140394 A1* | 5/2016 | Lee .................. G06V 20/40 382/103 |
| 2016/0179199 A1 | 6/2016 | Levesque et al. |

(Continued)

FOREIGN PATENT DOCUMENTS

| JP | 2009-181796 A | 8/2009 |
| JP | 5040684 B2 * | 10/2012 |

(Continued)

OTHER PUBLICATIONS

International Search Report (PCT/ISA/210) and Written Opinion (PCT/ISA/237) dated Jun. 20, 2022 issued by the International Searching Authority in International Application No. PCT/KR2022/003759.

*Primary Examiner* — Pinalben Patel
(74) *Attorney, Agent, or Firm* — Sughrue Mion, PLLC

(57) ABSTRACT

An electronic device according to various embodiments may include a communication circuit and a processor, wherein the processor is configured to receive a streaming image photographed by a first external electronic device through the communication circuit from a first external electronic device, identify a start of a fastening action of a user with respect to a target connector based on the streaming image, periodically obtain sensor data from a second external electronic device worn on the user based on identifying the start of the fastening action, identify an end of the fastening action with respect to the target connector based on the streaming image, and determine whether the target connec- (Continued)

tor is fastened based on the sensor data obtained from the start of the fastening action to the end of the fastening action.

20 Claims, 13 Drawing Sheets

(56) References Cited

U.S. PATENT DOCUMENTS

| | | | |
|---|---|---|---|
| 2020/0401972 A1 | 12/2020 | Sakurai et al. | |
| 2021/0056646 A1 | 2/2021 | Yoshimoto et al. | |
| 2021/0197369 A1 | 7/2021 | Hasunuma et al. | |
| 2024/0242648 A1* | 7/2024 | Kim .................... | G06F 3/0484 |

FOREIGN PATENT DOCUMENTS

| | | | |
|---|---|---|---|
| JP | 2018-169768 A | | 11/2018 |
| JP | 201916258 A | | 1/2019 |
| JP | 2019-207827 A | | 12/2019 |
| JP | 202091801 A | | 6/2020 |
| JP | 2020198133 A | | 12/2020 |
| JP | 20212136 A | | 1/2021 |
| KR | 1020150066845 A | | 6/2015 |
| KR | 101610912 | * | 2/2016 |
| KR | 1020160019610 A | | 2/2016 |
| KR | 1020210006431 A | | 1/2021 |
| WO | 2020/026299 A1 | | 2/2020 |

* cited by examiner

ELECTRONIC DEVICE AND METHOD FOR CHECKING CONNECTION OF A CONNECTOR

CROSS-REFERENCE TO RELATED APPLICATIONS

This application is a Continuation Application of International Application No. PCT/KR2022/003759, filed on Mar. 17, 2022, which claims benefit of priority to Korean Patent Application No. 10-2021-0052179, filed on Apr. 22, 2021, and to Korean Patent Application No. 10-2021-0098638, filed on Jul. 27, 2021, in the Korean Intellectual Property Office, the disclosures of which are incorporated herein in their entireties by reference.

BACKGROUND

1. Technical Field

Various embodiments relate to an electronic device for checking connection of a connector and a method for operating the same.

2. Description of the Related Art

Conventional processes for manufacturing objects in factories may include various process steps. For example, in a car production factory, cars may be produced through various manufacturing processes.

The various manufacturing processes may be performed by automated machines or robots. Among the various processes, however, there may be processes that require manual operations by workers, instead of automated machines or robots. For example, product assembly and inspection may require manual operations of the workers. For example, during product assembly, a worker may manually fasten a cable connector. In addition, during product inspection, a worker may manually inspect whether a cable connector is fastened or not.

Errors caused by improper fastening of a cable connector may result in fatal defects of the product. Therefore, during an object manufacturing process, it may be crucial to confirm whether or not the cable connector is correctly fastened. As such, during a process for confirming whether or not a cable connector is fastened, sensor data may be used to improve the accuracy regarding whether the same is fastened or not.

A conventional electronic device based on sensor data analysis may use a single kind of sensor data or various kinds of sensor data for a specific purpose. However, the conventional electronic device based on sensor data analysis may be difficult to properly drive, for example, due to restrictions on resources of the electronic device, when various kinds of sensor data analysis is necessary. In addition, the conventional electronic device based on sensor data analysis may excessively increase consumption of power stored in the battery when various kinds of sensor data analysis are necessary.

Various embodiments may provide an electronic device and a method for operating the same, wherein, based on a streaming image obtained by imaging a target connector fastening operation, the start time point of the fastening operation to the ending time point of the fastening operation are checked and, based on sensor data acquired during the fastening operation, it is determined whether or not the target connector has been fastened.

SUMMARY

An electronic device for checking connection of a connector, according to various embodiments, may include a communication circuit and a processor, wherein the processor is configured to receive a streaming image photographed by a first external electronic device through the communication circuit from the first external electronic device, identify a start of a fastening action of a user with respect to a target connector based on the streaming image, periodically obtain sensor data from a second external electronic device worn on the user based on identifying the start of the fastening action, identify an end of the fastening action with respect to the target connector based on the streaming image, and determine whether the target connector is fastened based on the sensor data obtained from the start of the fastening action to the end of the fastening action.

A method of operating an electronic device according to various embodiments, may include receiving, through a communication circuit from a first external electronic device, a streaming image photographed by the first external electronic device, identifying a start of a fastening action of a user with respect to a target connector based on the streaming image, periodically obtaining sensor data from a second external electronic device worn on the user based on identifying the start of the fastening action, identifying an end of the fastening action with respect to the target connector based on the streaming image, and determining whether the target connector is fastened based on the sensor data obtained from the start of the fastening action to the end of the fastening action.

An electronic device according to various embodiments, may include a camera, a communication circuit, and a processor, wherein the processor is configured to obtain a streaming image photographed using the camera, identify a start of a fastening action of a user with respect to a target connector based on the streaming image, periodically obtain sensor data from an external electronic device worn on the user based on identifying the start of the fastening action, identify an end of the fastening action with respect to the target connector based on the streaming image, and determine whether the target connector is fastened based on the sensor data obtained from the start of the fastening action to the end of the fastening action.

Advantageously, an electronic device, according to various embodiments of the present disclosure, may reduce errors (e.g., product defects) resulting from abnormal fastening of a connector of an object that a worker has manually fastened.

DETAILED DESCRIPTION

Figure 1:
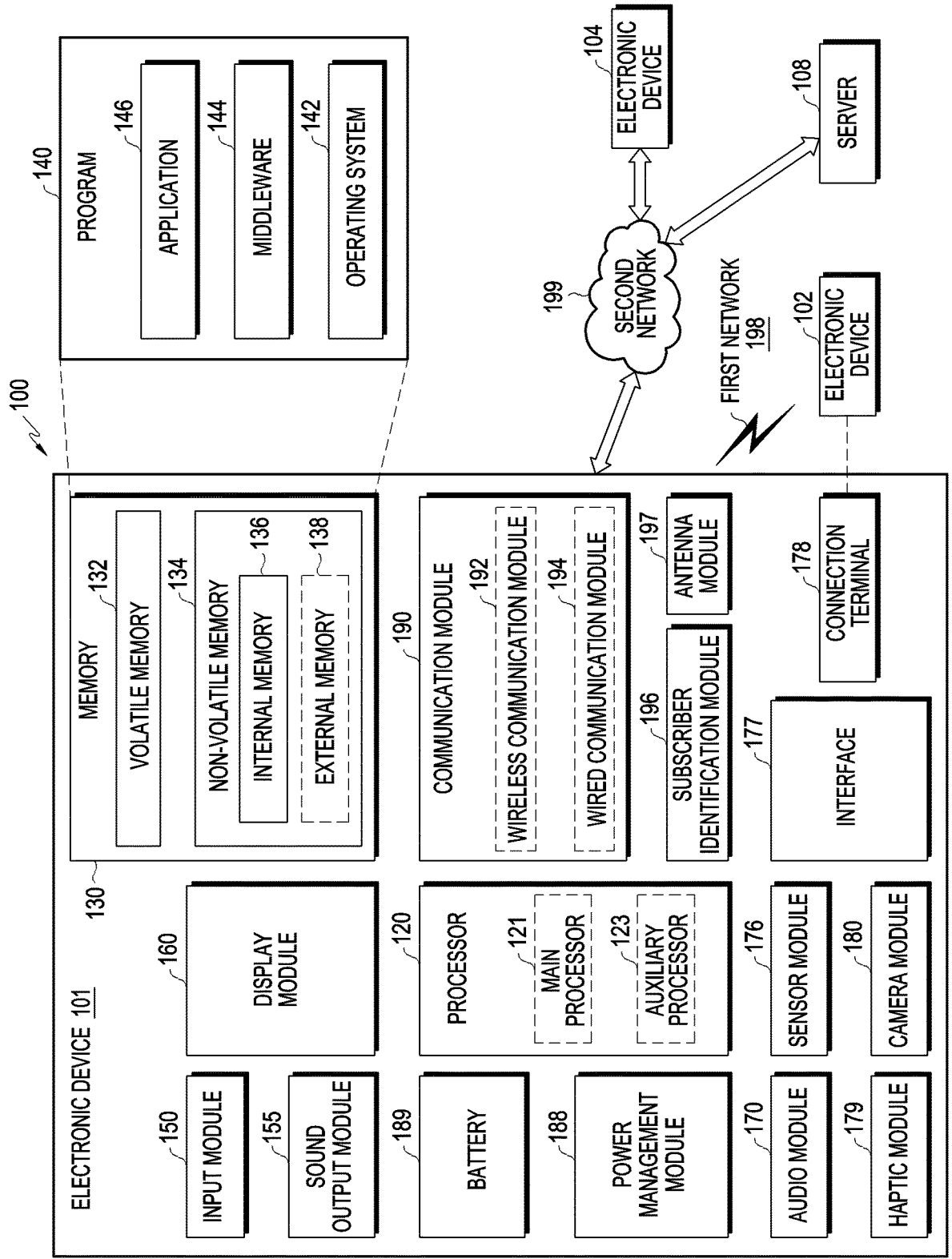
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
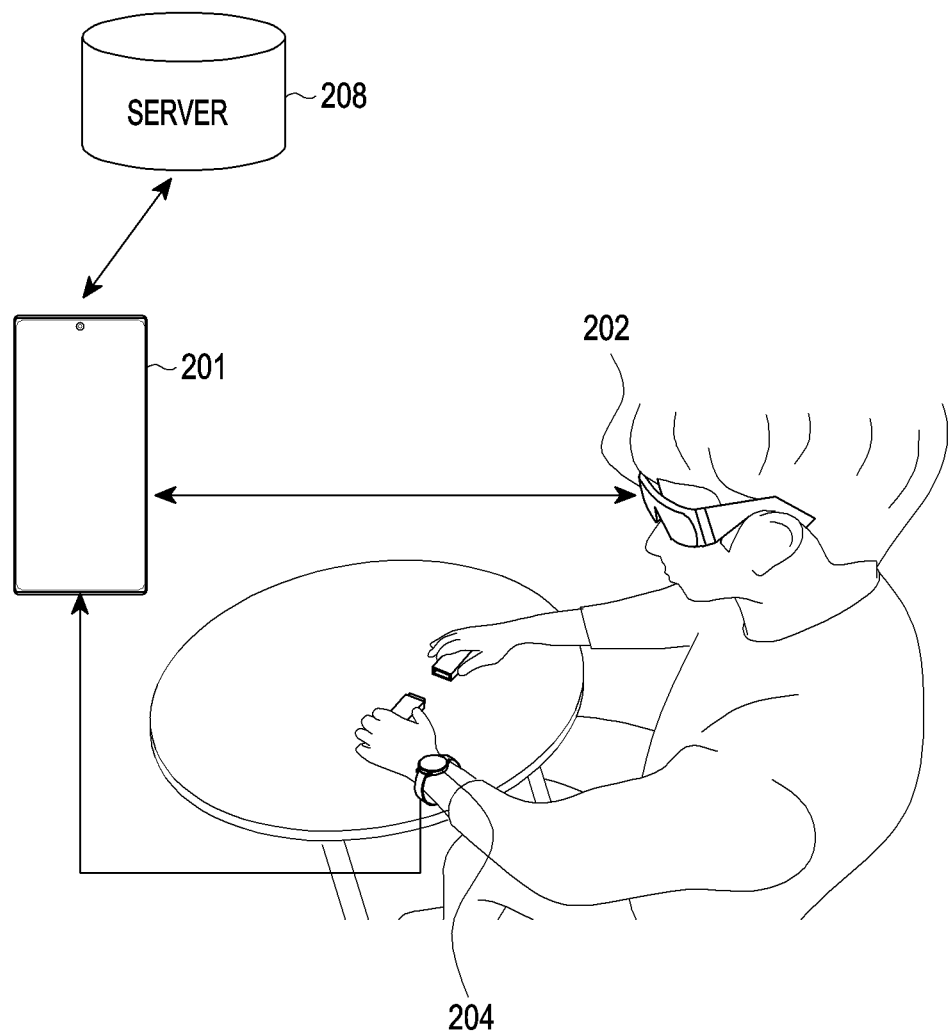
FIG. 2A is a diagram of an electronic system according to various embodiments.

FIG. 2A is a diagram of an electronic system according to various embodiments.

Referring to FIG. 2A, the electronic system may include an electronic device 201, a first external electronic device 202, a second external electronic device 204, and a server 208.

According to various embodiments, the electronic device 201 may be implemented in the same or similar manner to the electronic device 101 of FIG. 1. For example, the electronic device 201 may be implemented as a smartphone.

According to various embodiments, the electronic device 201 may be connected (e.g., communicatively coupled) to the first external electronic device 202 (e.g., the electronic device 102 of FIG. 1) through a wireless communication technology and/or a wired communication interface. For example, the electronic device 201 may communicate with the first external electronic device 202 through a USB interface.

According to various embodiments, the electronic device 201 may be connected (e.g., communicatively coupled) to the second external electronic device 204 (e.g., the electronic device 104 of FIG. 1) through a wireless communication technology and/or a wired communication interface. For example, the electronic device 201 may communicate with the second external electronic device 204 through a short-range wireless communication technology (e.g., Bluetooth communication technology).

According to various embodiments, the electronic device 201 may be connected (e.g., communicatively coupled) to a server (e.g., the server 108 of FIG. 1) through a wireless communication technology and/or a wired communication interface. For example, the electronic device 201 may be accessed and/or connected to the server 208 through a 4G network and/or a 5G network.

According to various embodiments, the electronic device 201 may receive an image captured by the first external electronic device 202 (e.g., the electronic device 102 of FIG. 1). For example, the electronic device 201 may stream an image captured by the first external electronic device 202. The electronic device 201 may obtain an image (hereinafter, a streaming image) streamed from the first external electronic device 202. For example, the first external electronic device 202 may be implemented as an electronic device including a camera. For example, the first external electronic device 202 may be implemented as a goggle-type or glasses-type wearable electronic device. For example, the streaming image may be an image captured by the target connector. For example, the target connector may refer to a component or product including a fastening part to which at least two parts can be fastened (or assembled). For example, the target connector may include a fastening part of an automotive component.

According to various embodiments, the electronic device 201 may obtain a streaming image captured by itself using a camera included in the electronic device 201. That is, the electronic device 201 may obtain an image from the first external electronic device 202 or obtain the image using a camera included in the electronic device 201.

According to various embodiments, the electronic device 201 may transmit a streaming image to the server 208 (e.g., the server 108 of FIG. 1). The server 208 may identify the start time point and the end time point of the fastening action of the user with respect to the target connector based on the streaming image. In addition, the server 208 may identify the type of the target connector. The server 208 may transmit information on the start time point of the fastening action and the information on the end time point of the fastening action to the electronic device 201. In addition, the server 208 may transmit information on the type of the target connector to the electronic device 201 together with information on the start time point of the fastening action.

According to various embodiments, the electronic device 201 may identify the start time point and end time point of the fastening action of the user with respect to the target connector based on the streaming image. In addition, the electronic device 201 may identify the type of the target connector. That is, the electronic device 201 may use the server 208 or a processor (e.g., processor 120) included in the electronic device 201 itself to identify the start and end time points of the fastening action with respect to the target connector and the type of the target connector.

According to various embodiments, the electronic device 201 may receive sensor data sensed by the second external electronic device 204 (e.g., the electronic device 104 of FIG. 1). For example, the electronic device 201 may request sensor data from the second external electronic device 204. The second external electronic device 204 may transmit sensor data sensed by a sensor of the second external electronic device 204 to the electronic device 201 in response to a request from the electronic device 201. For example, the second external electronic device 204 may be implemented as an electronic device including at least one sensor (e.g., vibration sensor, acceleration sensor, microphone, bio-signal sensor (electrocardiogram (ECG) sensor, photoplethysmography (PPG) sensor, and fingerprint sensor)). For example, the sensor data may include at least one of data sensed by the acceleration sensor, audio data, and biometric data. For example, the second external electronic device 204 may be implemented as a wearable electronic device (e.g., a watch-type wearable device) that may be worn on a wrist of the user.

According to various embodiments, the electronic device 201 may obtain sensor data from the second external electronic device 204 from a start time point to an end time point of the fastening action of the user with respect to the target connector. For example, the electronic device 201 may request the transmission of sensor data from the second external electronic device 204 at the start time point of the fastening action of the user with respect to the target connector. In addition, the electronic device 201 may request the second external electronic device 204 to stop transmission of sensor data at the end time point of the fastening action of the user with respect to the target connector.

According to various embodiments, the electronic device 201 may determine or check whether the target connector is fastened based on sensor data obtained from the start time point to the end time point of the fastening action of the user. For example, the electronic device 201 may determine whether the target connector is fastened or not.

According to various embodiments, the electronic device 201 may transmit information indicating whether the target connector is fastened to the second external electronic device 204. The second external electronic device 204 may display and/or output information indicating whether the target connector is fastened. Alternatively, the electronic device 201 may display and/or output information indicating whether the target connector is fastened by itself.

Figure 2B:
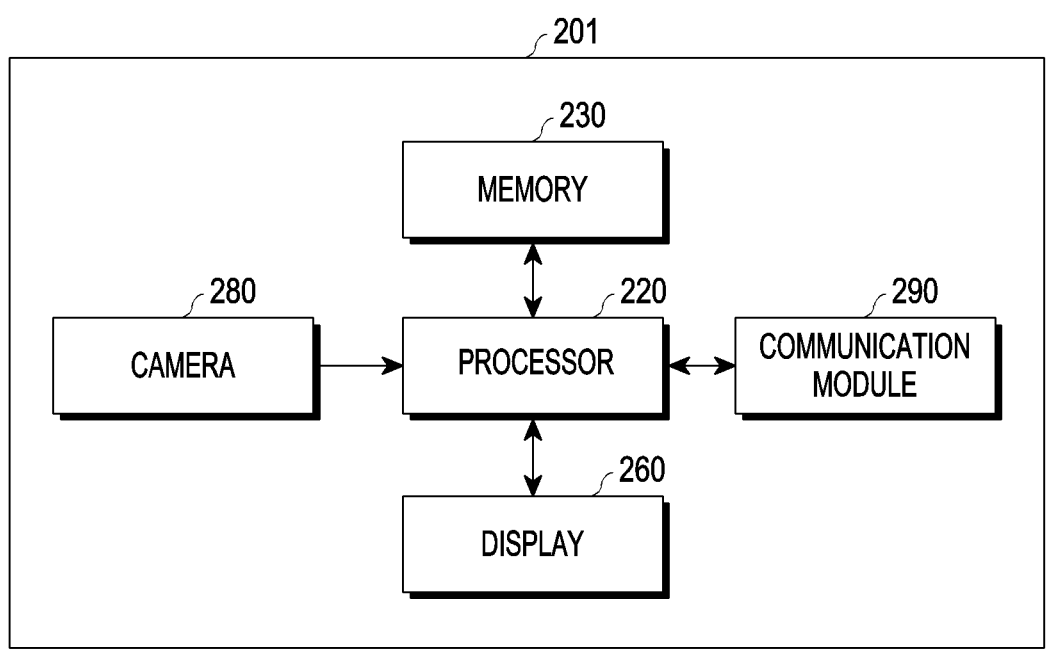
FIG. 2B is a schematic block diagram of an electronic device according to various embodiments.

FIG. 2B is a schematic block diagram of an electronic device according to various embodiments.

Referring to FIG. 2B, the electronic device 201 may include a processor 220, a memory 230, a display 260, a camera 280, and a communication module 290 (e.g., a communication circuit).

According to various embodiments, the processor 220 may control the overall operation of the electronic device 201. For example, the processor 220 may be implemented in the same or similar manner to the processor 120 of FIG. 1.

According to various embodiments, the processor 220 may receive an image captured by the first external electronic device 202 (hereinafter, referred to as a streaming image) from the first external electronic device 202 through the communication module 290 (e.g., the communication module 190 of FIG. 1, a communication circuit). The processor 220 may identify the start (or start time point) of the fastening action of the user with respect to the target connector based on the streaming image. The processor 220 may obtain sensor data periodically and/or aperiodically from the second external electronic device 204 worn by the user based on confirming the start of the fastening action. For example, the processor 220 may obtain the sensor data before requesting to stop transmission of the sensor data. The processor 220 may identify the end (or end time point) of the fastening action with respect to the target connector based on the streaming image. The processor 220 may request the second external electronic device 204 to stop transmission of the sensor data based on the confirmation of termination of the fastening action. The processor 220 may determine whether the target connector is fastened based on sensor data obtained from the start to the end of the fastening action. The processor 220 may transmit information indicating whether the target connector is fastened to the second external electronic device 204. According to various embodiments, the processor 220 may display information indicating whether the connection is fastened or not fastened through the display 260 (e.g., the display module 160 of FIG. 1).

According to various embodiments, the processor 220 may identify a target connector (or information on the target connector) among a plurality of connectors (or information on a plurality of connectors) stored in the memory 230 (e.g., memory 130 of FIG. 1) based on the streaming image. For example, the processor 220 may load information on the target connector and check whether the target connector is fastened or not based on sensor data and the loaded information on the target connector.

According to various embodiments, the processor 220 may transmit the streaming image to the server 208 through the communication module 290 based on an operation of receiving the streaming image from the first external electronic device 202. Alternatively, the processor 220 may transmit a streaming image captured through the camera 280 (e.g., the camera 180 of FIG. 1) to the server 208. The processor 220 may transmit the received or obtained streaming image to the server 208 in real time.

According to various embodiments, the processor 220 may obtain information (e.g., information on the start time point and information on the end time point of the fastening action) on a fastening action with respect to the target connector from the server 208 through the communication module 290. For example, while continuously transmitting the streaming image to the server 208, the processor 220 may receive information on the start time point of the fastening action from the server 208 and then obtain information on the end time point of the fastening action. In addition, the processor 220 may obtain information on the type of the target connector together with information on the start time point from the server 208. The processor 220 may use the server 208 to obtain information (e.g., information on the start time point and information on the end time point of the fastening action) on the fastening action with respect to the target connector and information on the type of the target connector.

According to various embodiments, the processor 220 may obtain information (e.g., information on the start time point and information on the end time point of the fastening action) on a fastening action with respect to the target connector and information on the type of the target connector without using the server 208. For example, the processor 220 may obtain information (e.g., information on the start time point and information on the end time point of the fastening action) on a fastening action with respect to the target connector and information on the type of the target connector by analyzing the streaming image by itself.

Hereinafter, although the electronic device 201 performs the following operations, at least some of the operations performed by the electronic device 201 may be controlled by the processor 220.

Figure 3:
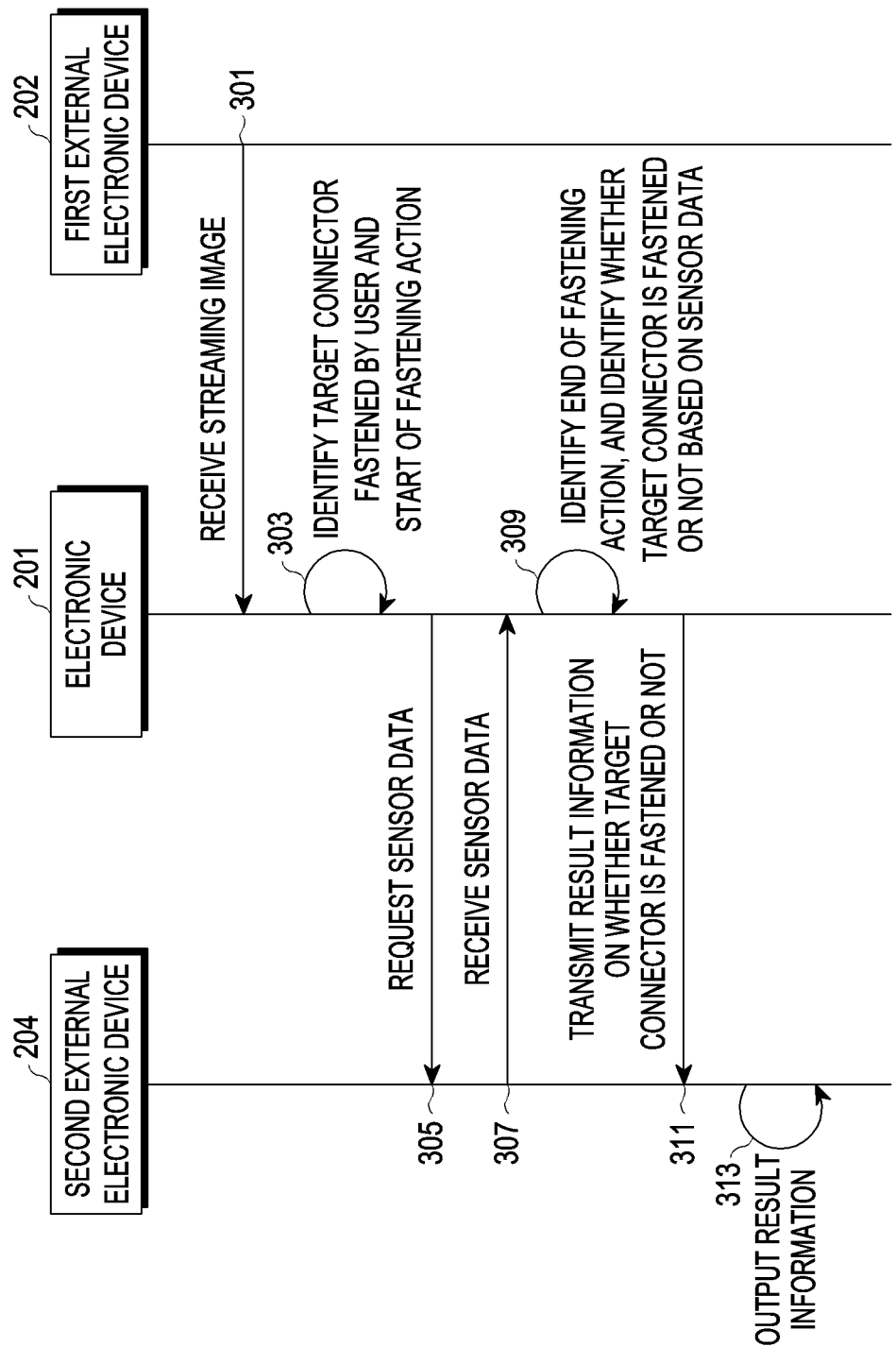
FIG. 3 is a diagram illustrating a first operation of an electronic device according to various embodiments.

FIG. 3 is a diagram illustrating a first operation of an electronic device according to various embodiments.

Referring to FIG. 3, according to various embodiments, in operation 301, the electronic device 201 may receive (or obtain) a streaming image captured by the first external electronic device 202 from the first external electronic device 202. The electronic device 201 may receive the streaming image captured by the first external electronic device 202 periodically and/or in real time from the first external electronic device 202. For example, the electronic device 201 may continuously receive the streaming image until the target connector is checked (or determined) to be fastened.

According to various embodiments, in operation 303, the electronic device 201 may identify the type of the target connector to be fastened by the user and the start (or start time point) of the fastening action of the user based on the streaming image. For example, the electronic device 201 may transmit the streaming image to the server 208 to obtain information on the type of the target connector and the start of the fastening action of the user. Alternatively, the electronic device 201 may obtain information on the type of the target connector and the start of the fastening action of the user by analyzing the streaming image.

According to various embodiments, in operation 305, the electronic device 201 may request sensor data from the second external electronic device 204 when the start of the fastening action of the user is confirmed.

According to various embodiments, in operation 307, the electronic device 201 may receive sensor data from the second external electronic device 204. For example, the electronic device 201 may receive at least one of vibration data (e.g., data sensing vibration caused by a fastening action of the user), audio data (e.g., data sensing sound caused by a fastening action of the user), and bio-signal data (e.g., data sensing a bio-signal caused by a fastening action of the user) as sensor data.

According to various embodiments, in operation 309, the electronic device 201 may confirm the end of the fastening action of the user, and check whether the target connector is fastened based on sensor data obtained from the start (or start time point) to the end (or end point) of the fastening action. The electronic device 201 may check whether the target connector is fastened based on sensor data obtained during a period in which the user performs a fastening action with respect to the target connector. When the end of the fastening action of the user is confirmed, the electronic device 201 may transmit a signal (or message) requesting the second external electronic device 204 to stop transmission of the sensor data. For example, the electronic device 201 may obtain information on the end of the fastening action of the user through the server 208. Alternatively, the electronic device 201 may obtain information on the type of the target connector and termination of the fastening action of the user by analyzing the streaming image.

According to various embodiments, in operation 311, the electronic device 201 may transmit result information indicating whether the target connector is fastened to the second external electronic device 204. For example, the result information indicating whether the target connector is fastened may include information indicating that the target connector is fastened (e.g., good, pass) or not fastened (e.g., bad, fail).

According to various embodiments, in operation 313, the second external electronic device 204 may output (e.g., displayed on the display of the second external electronic device 204) the result information. According to another embodiment, the electronic device 201 may display the result information indicating whether the target connector is fastened on the display 260.

Figure 4:
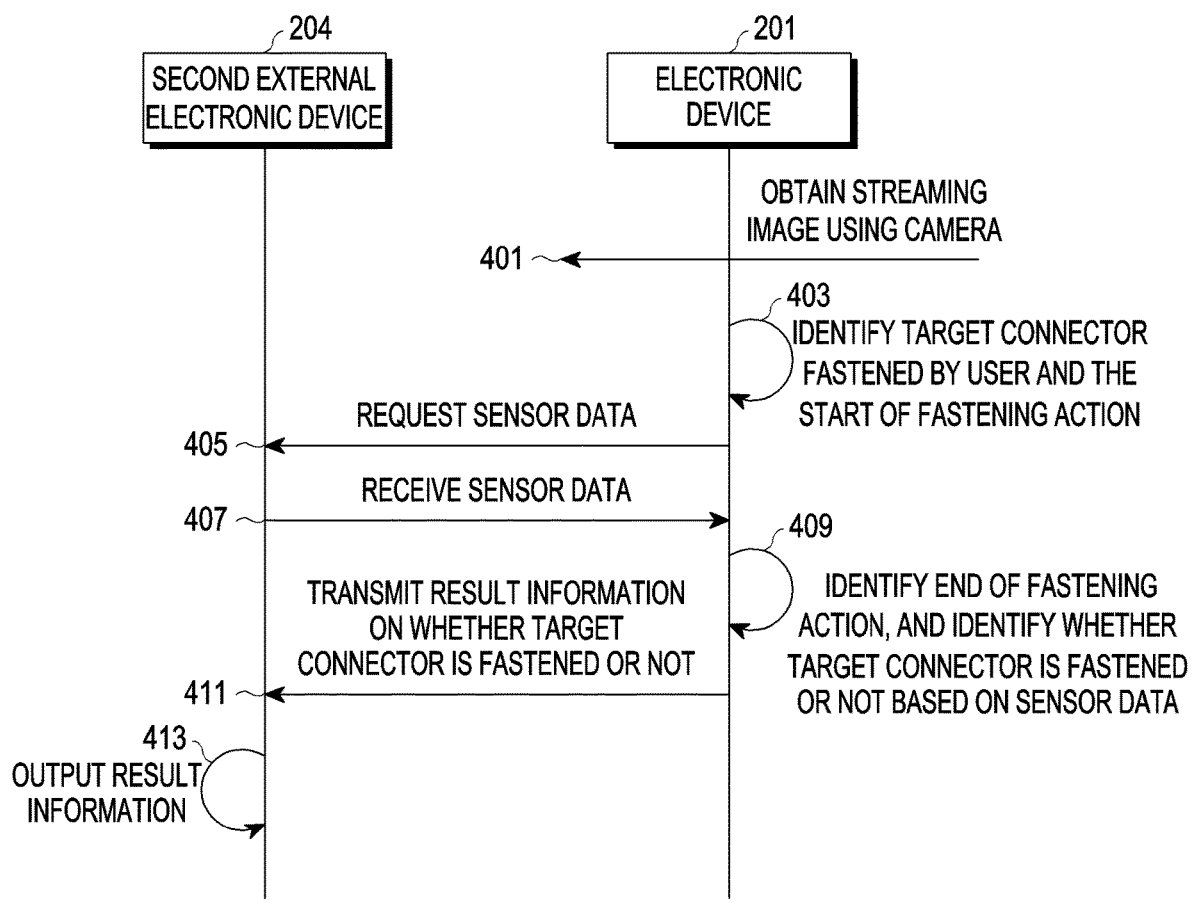
FIG. 4 is a diagram illustrating a second operation of an electronic device according to various embodiments.

FIG. 4 is a diagram illustrating a second operation of an electronic device according to various embodiments.

Referring to FIG. 4, according to various embodiments, in operation 401, the electronic device 201 may obtain a streaming image captured using the camera 280. The electronic device 201 may obtain the streaming image periodically and/or in real time using the camera 280. For example, the electronic device 201 may continuously obtain the streaming image until the target connector is checked (or determined) to be fastened.

According to various embodiments, operations 403 to 413 may be performed in the same way as or similarly to operations 303 to 313 of FIG. 3.

According to various embodiments, in operation 403, the electronic device 201 may identify the type of the target connector to be fastened by the user and the start (or start time point) of the fastening action of the user based on the streaming image. For example, the electronic device 201 may transmit a streaming image to the server 208 to obtain information on the type of the target connector and the start of the fastening action of the user. Alternatively or additionally, the electronic device 201 may obtain information on the type of the target connector and the start of the fastening action of the user by analyzing the streaming image.

According to various embodiments, in operation 405, the electronic device 201 may request sensor data from the second external electronic device 204 when the start of the fastening action of the user is confirmed.

According to various embodiments, in operation 407, the electronic device 201 may receive sensor data from the second external electronic device 204. For example, the electronic device 201 may receive at least one of vibration data, audio data, and bio-signal data as sensor data.

According to various embodiments, in operation 409, the electronic device 201 may confirm the end of the fastening action of the user, and check whether the target connector is fastened based on sensor data obtained from the start (or start time point) to the end (or end point) of the fastening action.

According to various embodiments, in operation 411, the electronic device 201 may transmit result information indicating whether the target connector is fastened to the second external electronic device 204. For example, the result information indicating whether the target connector is fastened may include information indicating that the target connector is fastened or not fastened.

According to various embodiments, in operation 413, the second external electronic device 204 may output (e.g., displayed on the display of the second external electronic device 204) the result information.

Figure 5:
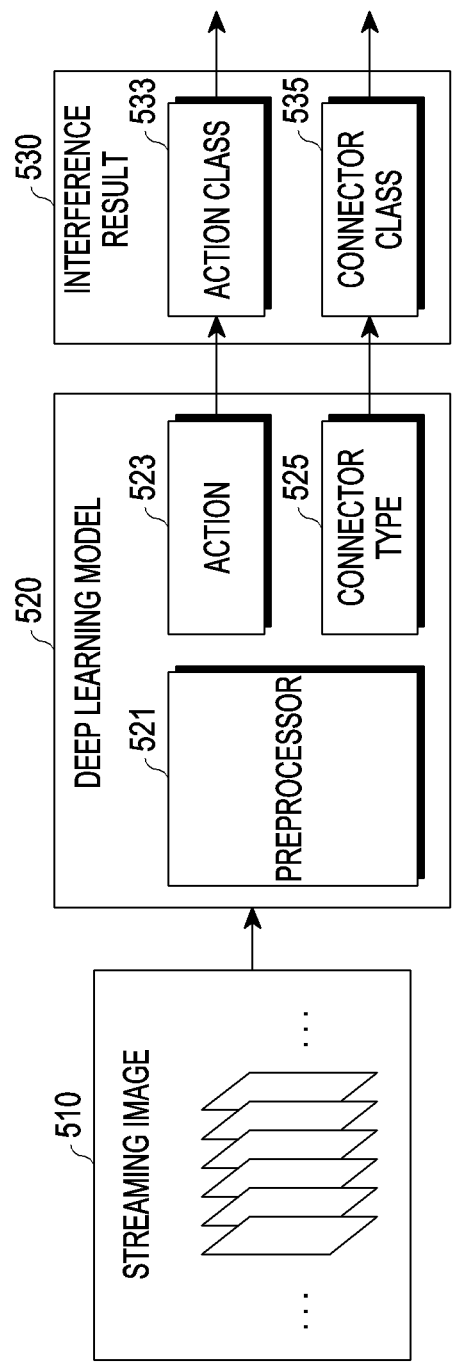
FIG. 5 is a block diagram illustrating an operation of checking a fastening action and a type of a target connector based on a streaming image according to various embodiments.

FIG. 5 is a block diagram illustrating an operation of checking a fastening action and a type of a target connector based on a streaming image according to various embodiments.

Referring to FIG. 5, according to various embodiments, the electronic device 201 and/or the server 208 may obtain the streaming image 510. For example, the streaming image 510 may include a plurality of frames in which the target connector is photographed.

According to various embodiments, the electronic device 201 may identify information on the fastening action of the user (e.g., start and end of fastening action) with respect to the target connector and information on the target connector (e.g., type of target connector) through the analysis of the streaming video 510 using the server 208 or by itself.

According to various embodiments, the electronic device 201 and/or the server 208 may input a plurality of frames (e.g., captured at a rate of 30 frames per second (fps)) included in the streaming image 510 to the deep learning model 520. For example, the electronic device 201 and/or the server 208 may perform a pre-processing operation on the plurality of frames included in the streaming image 510 through the preprocessor 521. For example, the preprocessor 521 may obtain a specified number (e.g., 8) of frames last obtained among a plurality of frames included in the streaming image 510. The electronic device 201 and/or the server 208 may obtain information on the fastening action of the user 523 and information on the type of the target connector 525 based on the specified number of frames after performing a pre-processing operation on the streaming image 510. For example, the deep learning model 520 may simultaneously output information on the fastening action of the user 523 and the type of the target connector 525 as a result based on a specified number of frames.

According to various embodiments, through the interference result module 530, the electronic device 201 and/or the server 208 may output an action class 533 including the start or end of the fastening action and a connector class 535 including the type of the target connector being fastened as result information. For example, the server 208 may transmit data including the action class 533 including the start or end of the fastening action and the connector class 535 including the type of the target connector being fastened to the electronic device 201. Alternatively, the electronic device 201 may obtain data including the action class 533 including the start or end of a fastening action and the connector class 535 including the type of the target connector being fastened by itself.

According to various embodiments, the electronic device 201 may request transmission of sensor data from the second external electronic device 204 in response to data indicating the start of the fastening action 533. The electronic device 201 may load a model for the target connector among the plurality of connectors based on data indicating the classification (or type) of the target connector.

According to various embodiments, the electronic device 201 may request the second external electronic device 204 to stop transmission of sensor data in response to the data indicating the end of the fastening action 533.

Figure 6:
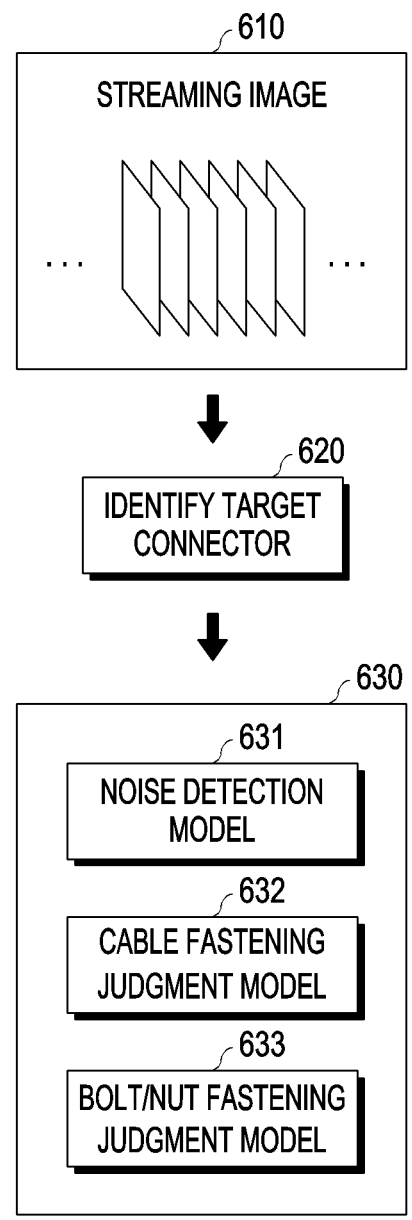
FIG. 6 is a diagram illustrating an operation of checking a target connector among a plurality of connectors according to various embodiments.

FIG. 6 is a diagram illustrating an operation of checking a target connector among a plurality of connectors according to various embodiments.

Referring to FIG. 6, according to various embodiments, the electronic device 201 and/or the server 208 may obtain a streaming image 610. For example, the streaming image 610 may include a plurality of frames in which the target connector is photographed.

According to various embodiments, the electronic device 201 may use the server 208 or analyze the streaming image by itself to identify information on the target connector (e.g., type of target connector).

According to various embodiments, the electronic device 201 may store information 630 on a plurality of connectors in the memory 230. For example, the information 630 on the plurality of connectors may include model information 631 to 633 for determining whether the first connector, the second connector, and the third connector are fastened. For example, the electronic device 201 may load a model (e.g., cable fastening judgment model 632) for determining whether the second connector is fastened among the models 631 to 633 for the plurality of connectors based on the information 620 on the target connector. The electronic device 201 may determine whether a target connector (e.g., a cable) is fastened based on the loaded model and sensor data received from the second external electronic device 204.

Figure 7:
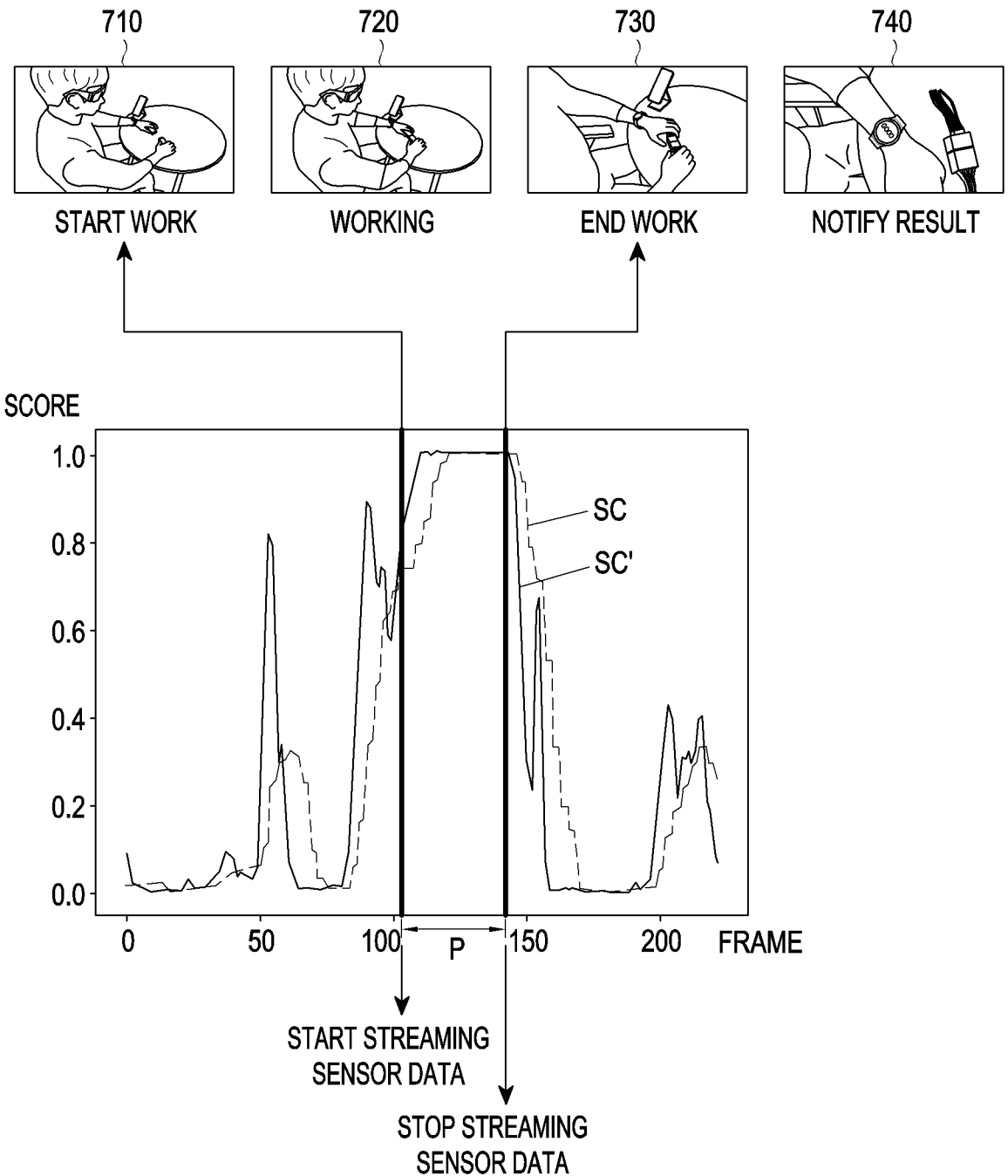
FIG. 7 is a diagram illustrating a first operation of checking whether a target connector is fastened using sensor data according to various embodiments.

FIG. 7 is a diagram illustrating a first operation of checking whether a target connector is fastened using sensor data according to various embodiments.

Referring to FIG. 7, according to various embodiments, the electronic device 201 may determine whether the target connector is fastened using sensor data obtained from the start to the end of the fastening action of the user.

According to various embodiments, the electronic device 201 and/or the server 208 may generate a score signal SC' for determining the start and end of a fastening action (or fastening operation) with respect to the target connector based on a plurality of frames included in the streaming image. The electronic device 201 and/or the server 208 may generate the score signal SC' with respect to a streaming image obtained periodically or in real time. The electronic device 201 and/or the server 208 may obtain a score information SC by further processing or refining the score signal SC'.

According to various embodiments, in operation 710, the electronic device 201 and/or the server 208 may identify the start of a fastening action (or a fastening operation) based on the score information. When the start of the fastening action (or fastening operation) is confirmed, the electronic device 201 may request streaming (or transmission) of sensor data from the second external electronic device 204.

According to various embodiments, in operation 720, the electronic device 201 and/or the server 208 may determine that a fastening action (or a fastening operation) is being performed based on the score information. The electronic device 201 may receive sensor data periodically and/or in real time from the second external electronic device 204.

According to various embodiments, in operation 730, the electronic device 201 and/or the server 208 may identify the end of the fastening action (or fastening operation) based on the score information. When the end of the fastening action (or fastening operation) is confirmed, the electronic device 201 may request the second external electronic device 204 to stop streaming (or stop transmitting) sensor data.

According to various embodiments, in operation 740, the electronic device 201 may determine whether the target connector is fastened based on the sensor data obtained during the first period P, which is a period from a start time point to an end time point of the fastening action (or fastening operation). In addition, the electronic device 201 may transmit information indicating whether the target connector is fastened to the second external electronic device 204 such that the second external electronic device 204 displays information indicating whether the target connector is fastened.

Figure 8:
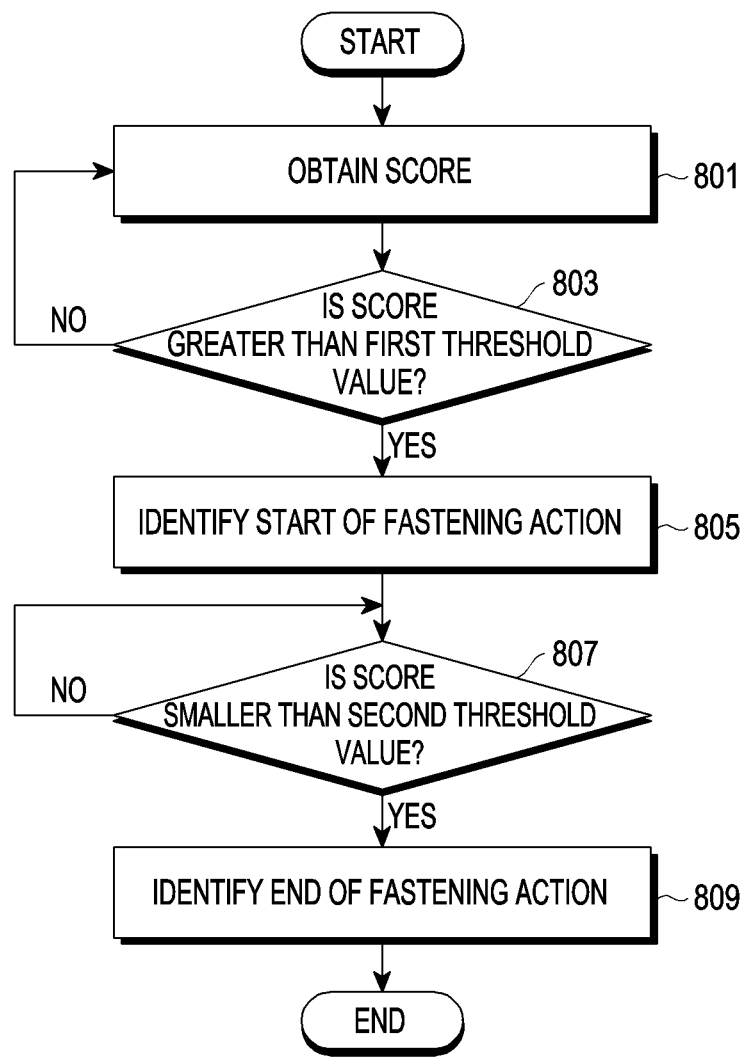
FIG. 8 is a diagram illustrating an operation of checking the start and end of a fastening action based on a streaming image according to various embodiments.

FIG. 8 is a diagram illustrating an operation of checking the start and end of a fastening action based on a streaming image according to various embodiments.

Referring to FIG. 8, according to various embodiments, in operation 801, the electronic device 201 and/or the server 208 may obtain score information for determining the start and end of a fastening action (or fastening operation) with respect to the target connector based on a plurality of frames included in the streaming image.

According to various embodiments, in operation 803, the electronic device 201 and/or the server 208 may determine whether the score is greater than a first threshold value. For example, the first threshold value may refer to a reference value for determining the start of a fastening action (or fastening operation) with respect to the target connector. For example, the first threshold value may be 0.7 based on the graph of FIG. 7.

According to various embodiments, when the score is greater than the first threshold value (Yes in operation 803), in operation 805, the electronic device 201 and/or the server 208 may identify the start of a fastening action with respect to the target connector. According to various embodiments, when the score is not greater than the first threshold value (No in operation 803), the electronic device 201 and/or the server 208 may identify that the fastening action with respect to the target connector has not started.

According to various embodiments, after the start of the fastening action with respect to the target connector is confirmed, in operation 807, the electronic device 201 and/or the server 208 may determine whether the score is smaller than a second threshold value. For example, the second threshold value may refer to a reference value for determining the end of a fastening action (or fastening operation) for the target connector. For example, the second threshold value may be 0.95 based on the graph of FIG. 7.

According to various embodiments, when the score is smaller than the second threshold value (Yes in operation 807), in operation 809, the electronic device 201 and/or the server 208 may identify the end of the fastening action with respect to the target connector. According to various embodiments, when the score is not smaller than the second threshold value (No in operation 807), the electronic device 201 and/or the server 208 may identify that the fastening action with respect to the target connector has not been completed.

Figure 9:
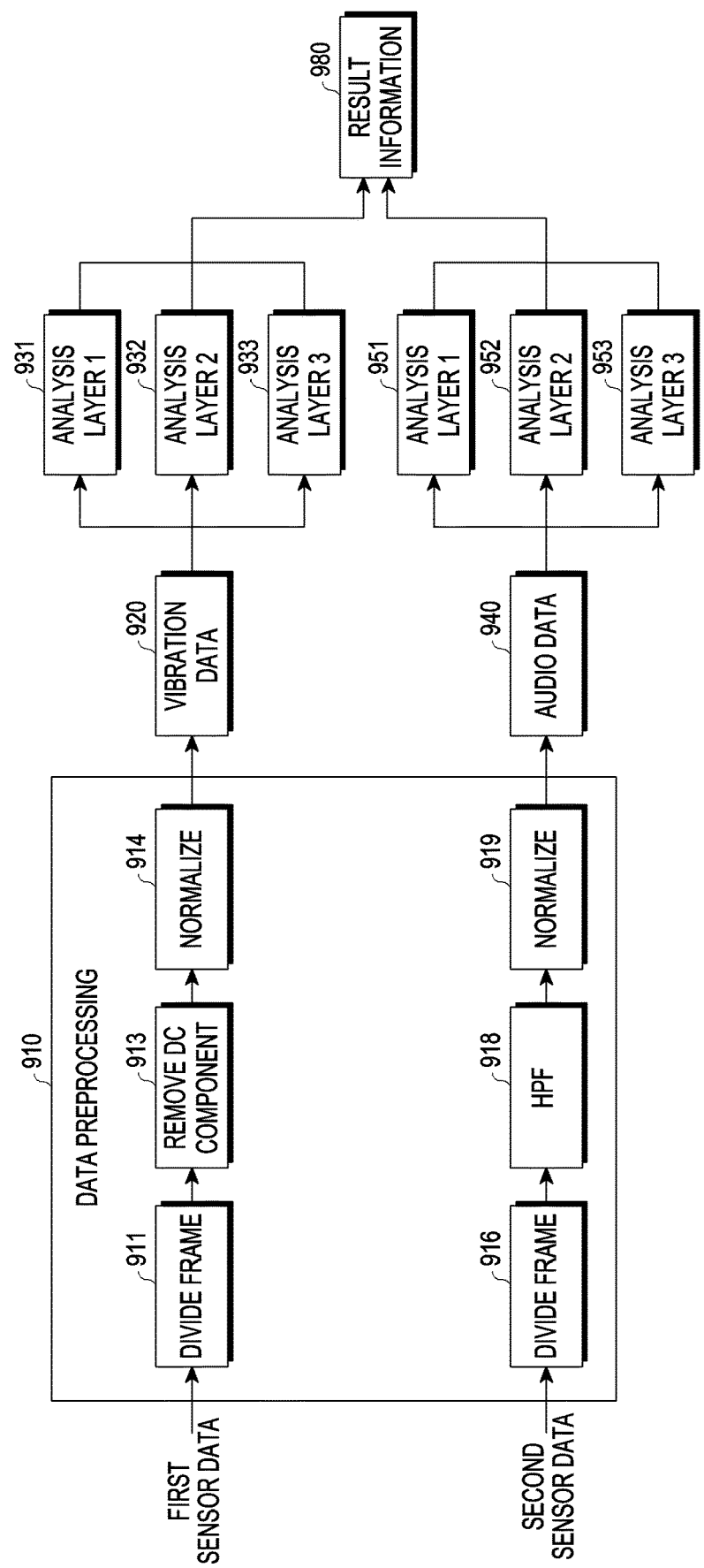
FIG. 9 is a diagram illustrating an operation of checking whether a target connector is fastened using a plurality of sensor data according to various embodiments.

FIG. 9 is a diagram illustrating an operation of checking whether a target connector is fastened using a plurality of sensor data according to various embodiments.

Referring to FIG. 9, according to various embodiments, the electronic device 201 may receive the first sensor data (e.g., data sensed by a vibration sensor (e.g., an acceleration sensor or a gyro sensor), acceleration data) and the second sensor data (e.g., data sensed by a microphone, audio data) from the second external electronic device 204. For example, the first sensor data may be data sensed at 3,300 Hz by values of the x, y, and z axes through the accelerometer. The second sensor data may be data sensing voice at 16,000 Hz.

Although FIG. 9 illustrates, for convenience of explanation, that the electronic device 201 receives two types of sensor data from the second external electronic device 204, the number or types of sensor data may not be limited thereto.

According to various embodiments, the electronic device 201 may preprocess the first sensor data and the second sensor data through a data preprocessor 910. For example, the electronic device 201 may preprocess the first sensor data and the second sensor data by a specified frame size (e.g., data corresponding to 500 msec). For example, the electronic device 201 may divide the first sensor data into a specified number of frames through a frame dividing module 911. In addition, the electronic device 201 may divide the second sensor data into a specified number of frames through the frame dividing module 916. The electronic device 201 may remove a direct current (DC) component from the first sensor data divided into a specified number of frames through a DC component removal module 913. In addition, the electronic device 201 may remove noise from the second sensor data divided into a specified number of frames through a high pass filter (HPF) 918. Thereafter, the electronic device 201 may normalize each of the first sensor data and the second sensor data through the normalizing modules 914 and 919.

According to various embodiments, for example, the electronic device 201 may obtain the vibration data 920 by normalizing the first sensor data and may obtain the audio data 940 by normalizing the second sensor data.

According to various embodiments, the electronic device 201 may input the vibration data 920 to three analysis layers 931 to 933. For example, the first analysis layer 931 may analyze the vibration data 920 with a short length, the second analysis layer 932 may analyze the vibration data 920 with a medium length, and the third analysis layer 933 may analyze the vibration data 920 with a long length. According to various embodiments, the electronic device 201 may input the audio data 940 to three analysis layers 951 to 953. For example, the first analysis layer 951 may analyze the audio data 940 with a short length, the second analysis layer 952 may analyze the audio data 940 with a medium length, and the third analysis layer 953 may analyze the audio data 940 with a long length.

According to various embodiments, the electronic device 201 may obtain result information 980 on whether the target connector is fastened based on the analysis of the vibration data 920 and the audio data 940. For example, the result information may include information indicating that the target connector is fastened or not fastened. An operation in which the electronic device 201 obtains the result information 980 on whether the target connector is fastened will be described in detail with reference to FIGS. 10 and 11 below.

Figure 10:
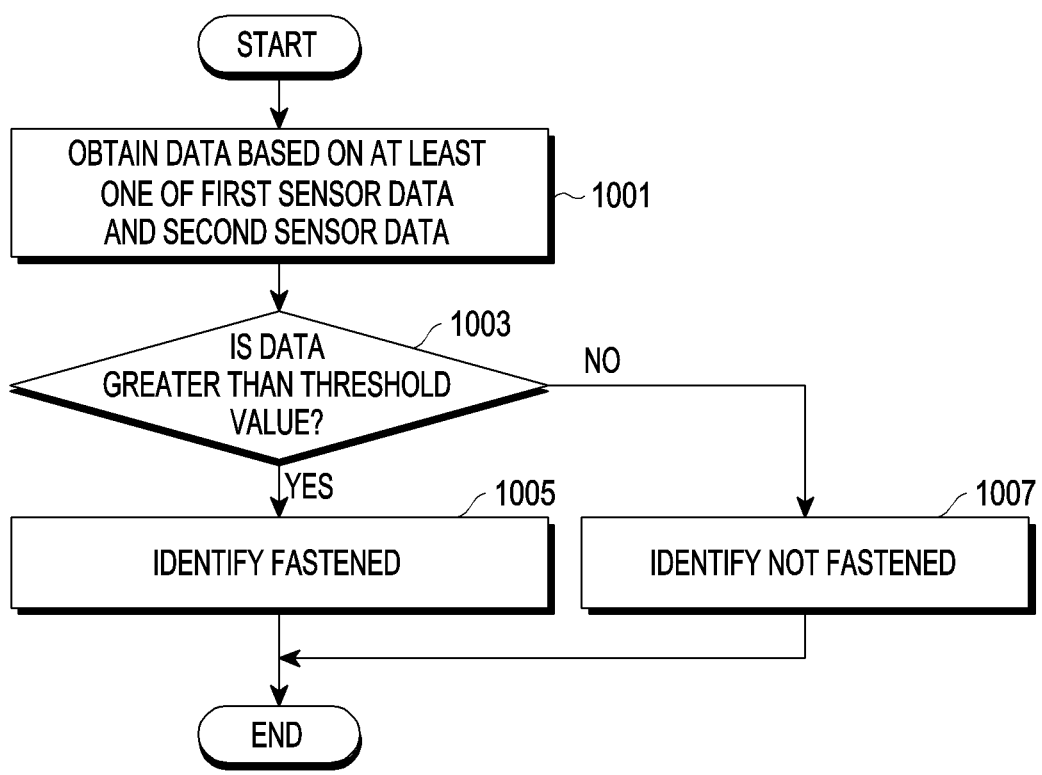
FIG. 10 is a flowchart illustrating a second operation of checking whether a target connector is fastened using sensor data according to various embodiments.

FIG. 10 is a flowchart illustrating a second operation of checking whether a target connector is fastened using sensor data according to various embodiments.

Referring to FIG. 10, according to various embodiments, in operation 1001, the electronic device 201 may obtain data based on at least one of the first sensor data and the second sensor data.

According to various embodiments, in operation 1003, the electronic device 201 may determine whether data exceeds a threshold value. For example, the threshold value may refer to a reference value for determining whether the target connector is fastened. For example, the threshold value may be 0.5 based on a value between 0 and 1. For example, when both the first sensor data and the second sensor data exceed the threshold value, the electronic device 201 may determine that the data exceeds the threshold value.

According to various embodiments, when the data exceeds the threshold value (Yes in operation 1003), in operation 1005, the electronic device 201 may confirm (or determine) that the target connector is normally fastened.

According to various embodiments, when the data does not exceed the threshold value (NO in operation 1003), in operation 1007, the electronic device 201 may confirm (or determine) that the target connector is not fastened. Alternatively, the electronic device 201 may confirm (or determine) that the target connector is not normally fastened.

Figure 11:
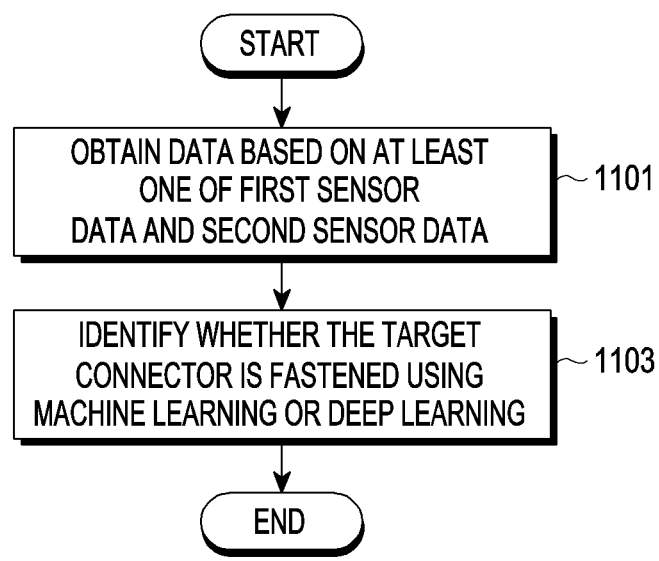
FIG. 11 is a flowchart illustrating a third operation of checking whether a target connector is fastened using sensor data according to various embodiments.

FIG. 11 is a flowchart illustrating a third operation of checking whether a target connector is fastened using sensor data according to various embodiments.

Referring to FIG. 11, according to various embodiments, in operation 1101, the electronic device 201 may obtain data based on at least one of the first sensor data and the second sensor data.

According to various embodiments, in operation 1103, the electronic device 201 may check whether the target connector is fastened using machine learning or deep learning. For example, machine learning (ML) may refer to a shallow learning technique. For example, machine learning may refer to a method of extracting features from data (e.g., sensor data) using basic machine learning (ML) techniques, such as support vector machine (SVM), random forest, and logistic regression, and learning with correct answers (e.g., fastened or not). For example, deep learning may refer to a method in which a deep learning model finds and learns features in learning data (sensor data) and correct answers (fastened or not). For example, deep learning may learn vibration data and audio data values and correct answers such as fastened or not fastened using a CNN (convolutional neural networks) model.

Figure 12:
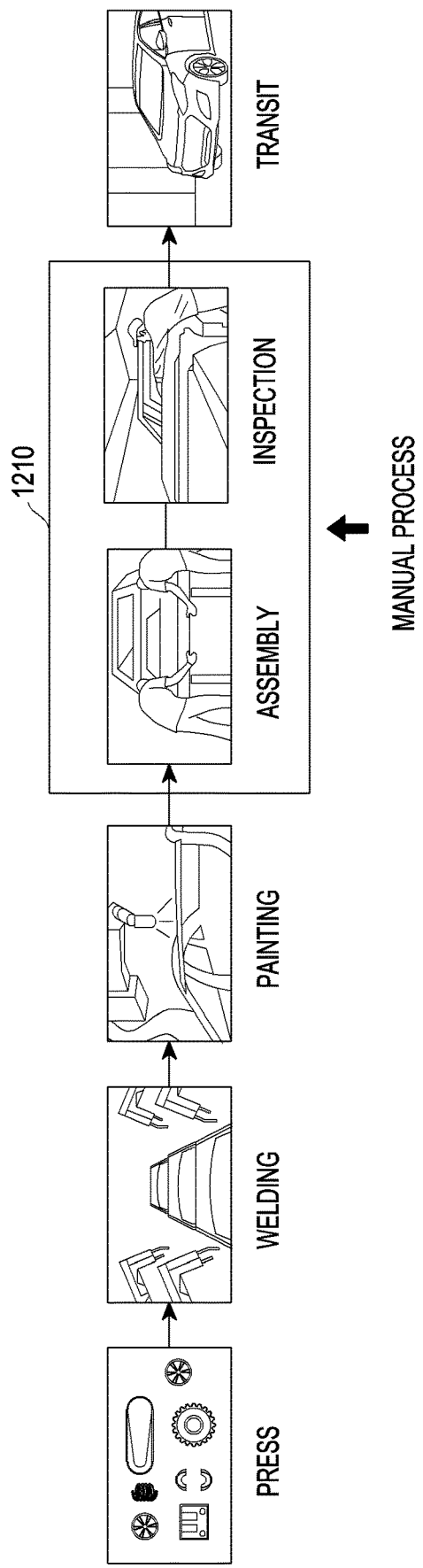
FIG. 12 is a diagram illustrating a field to which an operation of checking whether a target connector according to various embodiments is fastened is applied according to various embodiments.

FIG. 12 is a diagram illustrating a field to which an operation of checking whether a target connector is fastened is applied according to various embodiments.

Referring to FIG. 12, according to various embodiments, a process for producing a product in a factory may include various process steps. For example, in a factory for producing automobiles, there may be various manufacturing processes as illustrated in FIG. 12. For example, a process for manufacturing an automobile may include various manufacturing processes such as press, welding, painting, assembly, inspection, and shipment.

Various embodiments may be applied to assembly and inspection in which most of the processes are performed by a worker using his/her hand not an automated machine or a robot. For example, various embodiments may reduce an error (e.g., defective product) that occurs because the connector is not normally fastened when the operator directly fastens the connector (e.g., harness cable) of the vehicle.

According to various embodiments, an electronic device 201 may include a communication module 290 (e.g., a communication circuit) and a processor 220, and the processor may be configured to receive, through the communication circuit from a first external electronic device 202, a streaming image photographed by the first external electronic device 202, identify a start of a fastening action of the user with respect to a target connector based on the streaming image, periodically obtain sensor data from a second external electronic device 204 worn on the user based on identifying the start of a fastening action of the user, identify an end of the fastening action with respect to the target connector based on the streaming image, and determine whether the target connector is fastened based on the sensor data obtained from the start of the fastening action to the end of the fastening action.

The processor 220 may be configured to request a stop of transmission of the sensor data from the second external electronic device 204 based on the identifying of the end of the fastening action.

The processor 220 may be configured to identify the target connector among a plurality of connectors based on the streaming image.

The sensor data may include at least one of data sensed by an acceleration sensor, audio data, or biometric data.

The processor 220 may be configured to transmit, to the second external electronic device 204, information indicating whether the target connector is fastened.

The processor 220 may be configured to transmit, to the second external electronic device 204, information indicating non-fastening based on fastening of the target connector being not normally completed, and transmit, to the second external electronic device, information indicating fastening based on the fastening being normally completed.

The processor 220 may be configured to display information indicating whether the target connector is fastened through a display included in the electronic device 201.

The processor 220 may be configured to transmit the streaming image to a server 208 based on receiving the streaming image, and obtain, from the server, information on a start time point of the fastening action with respect to the target connector and information on an end time point of the fastening action with respect to the target connector.

The processor 220 may be configured to obtain, from the server 208, information on a type of the target connector together with information on the start time point.

The target connector may include a fastening part of an automobile part.

According to various embodiments, an operating method of the electronic device 201 may include receiving, through a communication circuit from a first external electronic device 202, a streaming image photographed by the first external electronic device, identifying a start of a fastening action of the user with respect to a target connector based on the streaming image, periodically obtaining sensor data from a second external electronic device 204 worn on the user based on identifying the start of the fastening action, identifying an end of the fastening action with respect to the target connector based on the streaming image, and determining whether the target connector is fastened based on the sensor data obtained from the start of the fastening action to the end of the fastening action.

The operating method of the electronic device 201 may further include requesting the second external electronic device 204 to stop transmission of the sensor data, based on the identifying of the end of the fastening action.

The operating method of the electronic device 201 may further include identifying the target connector among a plurality of connectors based on the streaming image.

The sensor data may include at least one of data sensed by an acceleration sensor, audio data, or biometric data.

The operating method of the electronic device 201 may further include transmitting, to the second external electronic device 204, information indicating whether the target connector is fastened.

The operation of transmitting the information indicating whether the target connector is fastened may include transmitting, to the second external electronic device 204, information indicating non-fastening based on fastening of the target connector being not normally completed, and transmitting, to the second external electronic device, information indicating fastening based on the fastening being normally completed.

The operating method of the electronic device 201 may further include transmitting the streaming image to a server 208, based on receiving the streaming image, and obtaining, from the server, information on a start time point of the fastening action with respect to the target connector and information on an end time point of the fastening action with respect to the target connector.

The operation of obtaining the information on the start time point may include obtaining, from the server 208, information on a type of the target connector together with information on the start time point.

According to various embodiments, an electronic device 201 may include a camera 280, a communication module 290 (e.g., a communication circuit), and a processor 220, wherein the processor may be configured to obtain a streaming image photographed using the camera, identify a start of a of the user fastening action with respect to a target connector based on the streaming image, periodically obtain sensor data from an external electronic device 204 worn on the user based on identifying the start, identify an end of the fastening action with respect to the target connector based on the streaming image, and determine whether the target connector is fastened based on the sensor data obtained from the start to the end.

The processor 220 may be configured to transmit, to the external electronic device 204, information indicating whether the target connector is fastened.

What is claimed is:

1. An electronic device comprising:
   a communication circuit,
   at least one processor, and
   a memory storing instructions that, when executed by the at least one processor, cause the electronic device to:
      receive, through the communication circuit from a first external electronic device, a streaming image in which a target connector is photographed by the first external electronic device,
      identify a start of a fastening action of a user with respect to the target connector, based on the streaming image,
      periodically obtain first sensor data and second sensor data from a second external electronic device worn on the user, based on identifying the start of the fastening action, the first sensor data comprising vibration data, and the second sensor data comprising audio data,
      identify an end of the fastening action with respect to the target connector, based on the streaming image, and
      determine whether the target connector is fastened, based on the first sensor data and the second sensor data obtained from the start of the fastening action to the end of the fastening action.

2. The electronic device of claim 1, wherein the instructions that, when executed by the at least one processor, cause the electronic device to request a stop of transmission of the first sensor data and the second sensor data from the second external electronic device, based on the identifying of the end of the fastening action.

3. The electronic device of claim 1, wherein the instructions that, when executed by the at least one processor, cause the electronic device to identify the target connector among a plurality of connectors, based on the streaming image.

4. The electronic device of claim 1, wherein the instructions that, when executed by the at least one processor, cause the electronic device to obtain additional sensor data comprising at least one of data sensed by an acceleration sensor or biometric data.

5. The electronic device of claim 1, wherein the instructions that, when executed by the at least one processor, cause the electronic device to transmit, to the second external electronic device, first information indicating whether the target connector is fastened.

6. The electronic device of claim 5, wherein the instructions that, when executed by the at least one processor, cause the electronic device to:
   transmit, to the second external electronic device, second information indicating non-fastening based on fastening of the target connector being not normally completed, and
   transmit, to the second external electronic device, third information indicating fastening based on the fastening being normally completed.

7. The electronic device of claim 1, wherein the electronic device further comprises a display, and wherein the instructions that, when executed by the at least one processor, cause the electronic device to display, through the display, information indicating whether the target connector is fastened.

8. The electronic device of claim 1, wherein the instructions that, when executed by the at least one processor, cause the electronic device to:
   transmit the streaming image to a server, based on receiving the streaming image, and
   obtain, from the server, information on a start time point of the fastening action with respect to the target connector and information on an end time point of the fastening action with respect to the target connector.

9. The electronic device of claim 8, wherein the instructions that, when executed by the at least one processor, cause the electronic device to obtain, from the server, information on a type of the target connector together with information on the start time point.

10. The electronic device of claim 1, wherein the target connector comprises a fastening part of an automobile part.

11. A method of operating an electronic device, the method comprising:
   receiving, through a communication circuit from a first external electronic device, a streaming image in which a target connector is photographed by the first external electronic device;
   identifying a start of a fastening action of a user with respect to the target connector, based on the streaming image;
   periodically obtaining first sensor data and second sensor data from a second external electronic device worn on the user, based on identifying the start of the fastening action, the first sensor data comprising vibration data, and the second sensor data comprising audio data;
   identifying an end of the fastening action with respect to the target connector, based on the streaming image; and
   determining whether the target connector is fastened, based on the first sensor data and the second sensor data obtained from the start of the fastening action to the end of the fastening action.

12. The method of claim 11, further comprising requesting the second external electronic device to stop transmission of the first sensor data and the second sensor data, based on the identifying of the end of the fastening action.

13. The method of claim 11, further comprising identifying the target connector among a plurality of connectors, based on the streaming image.

14. The method of claim 11, further comprising:
   obtaining additional sensor data comprising at least one of data sensed by an acceleration sensor or biometric data.

15. The method of claim 11, further comprising transmitting, to the second external electronic device, first information indicating whether the target connector is fastened.

16. The method of claim 15, wherein the transmitting of the first information indicating whether the target connector is fastened comprises:
   transmitting, to the second external electronic device, second information indicating non-fastening based on fastening of the target connector being not normally completed; and
   transmitting, to the second external electronic device, third information indicating fastening based on the fastening being normally completed.

17. The method of claim 11, further comprising:
   transmitting the streaming image to a server, based on receiving the streaming image; and
   obtaining, from the server, information on a start time point of the fastening action with respect to the target connector and information on an end time point of the fastening action with respect to the target connector.

18. The method of claim 17, wherein the obtaining of the information on the start time point comprises obtaining, from the server, information on a type of the target connector together with the information on the start time point.

19. An electronic device comprising:
a camera,
a communication circuit, and
a processor, wherein the processor is configured to:
- obtain, through the communication circuit, a streaming image in which a target connector is photographed using the camera,
- identify a start of a fastening action of a user with respect to the target connector, based on the streaming image,
- periodically obtain first sensor data and second sensor data from an external electronic device worn on the user, based on identifying the start of the fastening action, the first sensor data comprising vibration data, and the second sensor data comprising audio data,
- identify an end of the fastening action with respect to the target connector, based on the streaming image, and
- determine whether the target connector is fastened, based on the first sensor data and the second sensor data obtained from the start of the fastening action to the end of the fastening action.

20. The electronic device of claim 19, wherein the processor is further configured to transmit, to the external electronic device, information indicating whether the target connector is fastened.

* * * * *